United States Patent
Coffin et al.

(10) Patent No.: US 8,517,670 B1
(45) Date of Patent: Aug. 27, 2013

(54) GAS TURBINE ENGINE GEARED ARCHITECTURE AXIAL RETENTION ARRANGEMENT

(75) Inventors: James B. Coffin, Windsor, CT (US); Alessio Pescosolido, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/557,491

(22) Filed: Jul. 25, 2012

Related U.S. Application Data

(63) Continuation of application No. 13/435,353, filed on Mar. 30, 2012.

(51) Int. Cl.
- F01D 15/12 (2006.01)
- F01D 25/18 (2006.01)
- F03D 11/02 (2006.01)
- A47C 7/74 (2006.01)
- B63H 1/00 (2006.01)
- F16H 57/04 (2010.01)

(52) U.S. Cl.
USPC .......... 415/122.1; 416/170 R; 184/6.11; 184/6.12

(58) Field of Classification Search
USPC .......... 415/1, 9, 122.1, 175; 416/1, 2, 170 R; 184/6.11, 6.12
See application file for complete search history.

(56) References Cited

U.S. PATENT DOCUMENTS

| | | | |
|---|---|---|---|
| 5,433,674 A * | 7/1995 | Sheridan et al. | 475/346 |
| 6,183,388 B1 | 2/2001 | Hawkins | |
| 7,223,197 B2 | 5/2007 | Poulin et al. | |
| 7,270,620 B2 * | 9/2007 | Tiesler et al. | 475/159 |
| 7,621,843 B2 * | 11/2009 | Madge et al. | 475/346 |
| 7,694,505 B2 | 4/2010 | Schilling | |
| 7,926,260 B2 | 4/2011 | Sheridan et al. | |
| 7,950,151 B2 | 5/2011 | Duong et al. | |
| 8,087,885 B2 | 1/2012 | Suciu et al. | |
| 2010/0105516 A1 * | 4/2010 | Sheridan et al. | 475/346 |
| 2011/0130246 A1 | 6/2011 | McCune et al. | |
| 2011/0286836 A1 | 11/2011 | Davis | |

FOREIGN PATENT DOCUMENTS

EP 2 339 146 A1 6/2011

OTHER PUBLICATIONS

Gunston, Bill, "Jane's Aero-Engines," Issue Seven, Mar. 2000, pp. 510-512.

U.S. Appl. No. 13/362,456, filed Jan. 31, 2012, "Turbomachine Geared Architecture Support Assembly".

* cited by examiner

*Primary Examiner* — Nathaniel Wiehe
*Assistant Examiner* — Su Htay
(74) *Attorney, Agent, or Firm* — Carlson, Gaskey & Olds, P.C.

(57) ABSTRACT

A support assembly for a geared architecture includes an engine static structure. A flex support is secured to the engine static structure and includes a bellow. A support structure is operatively secured to the flex support. A geared architecture is mounted to the support structure. First members are removably secured to one of the engine static structure and the flex support and second members are removably secured to the support structure. The first and second members are circumferentially aligned with one another and spaced apart from one another during a normal operating condition. The first and second members are configured to be engageable with one another during an extreme event to limit axial movement of the geared architecture relative to the engine static structure.

22 Claims, 7 Drawing Sheets

GAS TURBINE ENGINE GEARED ARCHITECTURE AXIAL RETENTION ARRANGEMENT

This application is a continuation application of U.S. patent application Ser. No. 13/435,353, which was filed on Mar. 30, 2012.

BACKGROUND

This disclosure relates to limiting axial movement of a geared architecture within a turbomachine during an extreme event.

Turbomachines, such as gas turbine engines, typically include a fan section, a turbine section, a compressor section, and a combustor section. Turbomachines may employ a geared architecture connecting the fan section and the turbine section.

Support structures are used to hold the geared architecture within the turbomachine. The support structures may be relatively compliant to accommodate some movement of the geared architecture relative to other portions of the turbomachine. Extreme engine events such as fan blade loss or failure of fan shaft bearing supports may encourage significant axial movement of the geared architecture and the fan, relative to other portions of the turbomachine. These movements are undesirable as is known. The relatively compliant support structures may not provide desired axial retention of the geared architecture during extreme engine events.

SUMMARY

In one exemplary embodiment, a support assembly for a geared architecture includes an engine static structure. A flex support is secured to the engine static structure and includes a bellow. A support structure is operatively secured to the flex support. A geared architecture is mounted to the support structure. First members are removably secured to one of the engine static structure and the flex support and second members are removably secured to the support structure. The first and second members are circumferentially aligned with one another and spaced apart from one another during a normal operating condition. The first and second members are configured to be engageable with one another during an extreme event to limit axial movement of the geared architecture relative to the engine static structure.

In a further embodiment of any of the above, the flex support includes an end opposite the bellow. The first members are removably secured to the end.

In a further embodiment of any of the above, the end is an annular mounting flange.

In a further embodiment of any of the above, the support structure includes a torque frame and a carrier. The second members are removably secured to at least one of the torque frame and the carrier.

In a further embodiment of any of the above, the support structure includes a lubrication manifold. The second members are removably secured to the carrier and the lubrication manifold.

In a further embodiment of any of the above, the lubrication manifold is arranged axially between the carrier and the second member, engaging the lubrication manifold.

In a further embodiment of any of the above, threaded fasteners removably secure the first and second members to the flex support and the support structure.

In one exemplary embodiment, a method of retrofitting a support assembly to a gas turbine engine having a geared architecture includes the steps of providing attachment features in first and second structures, securing first and second members respectively to the first and second structures arranging the first and second members in axially spaced relation to one another in an installed condition, and installing the first structure onto an engine static structure and a geared architecture onto the second structure.

In a further embodiment of any of the above, the attachment feature providing step includes providing machined surfaces on the first and second structures.

In a further embodiment of any of the above, the first structure is a flex support having a bellow and an annular mounting flange opposite the bellow. The securing step includes mounting the first members to the annular mounting flange.

In a further embodiment of any of the above, the securing step includes mounting a lubrication manifold onto the second structure and securing the second members over the oil manifold.

In a further embodiment of any of the above, the installing step includes securing a torque frame to the flex support and a carrier. The carrier supports the geared architecture.

In a further embodiment of any of the above, the arranging step includes positioning the first and second members in a first angular position relative to one another, and rotating the first and second members from the first angular position to a second angular position against a stop.

In a further embodiment of any of the above, the securing steps include tightening threaded fasteners.

In a further embodiment of any of the above, the securing step relating to the second members includes selecting fasteners having a length longer than a length of pre-exiting fasteners at the attachment feature, which are removed during retrofitting.

In one exemplary embodiment, a gas turbine engine includes an engine static structure. A flex support is secured to the engine static structure and includes a bellow. A support structure is operatively secured to the flex support A geared architecture is mounted to the support structure. A fan section is operatively coupled to the geared architecture. First members are removably secured to one of the engine static structure and the flex support, and second members are removably secured to the support structure. The first and second members are circumferentially aligned with one another and spaced apart from one another during a normal operating condition. The first and second members are configured to be engageable with one another during an extreme fan section event to limit axial movement of the geared architecture relative to the engine static structure.

In a further embodiment of any of the above, the gas turbine engine includes low and high spools. Low pressure compressor and turbine sections are mounted on the low spool and high pressure compressor and turbine sections are mounted on the high spools. The low spool is operatively coupled to the geared architecture.

In a further embodiment of any of the above, the geared architecture is a planetary gear train.

In a further embodiment of any of the above, the fan section includes a fan shaft supporting a fan. The fan shaft is supported relative to the engine static structure by bearings.

In a further embodiment of any of the above, the gas turbine engine includes threaded fasteners that removably secure the first and second members to the flex support and the support structure.

BRIEF DESCRIPTION OF THE DRAWINGS

The disclosure can be further understood by reference to the following detailed description when considered in connection with the accompanying drawings wherein.

DETAILED DESCRIPTION

Figure 1:
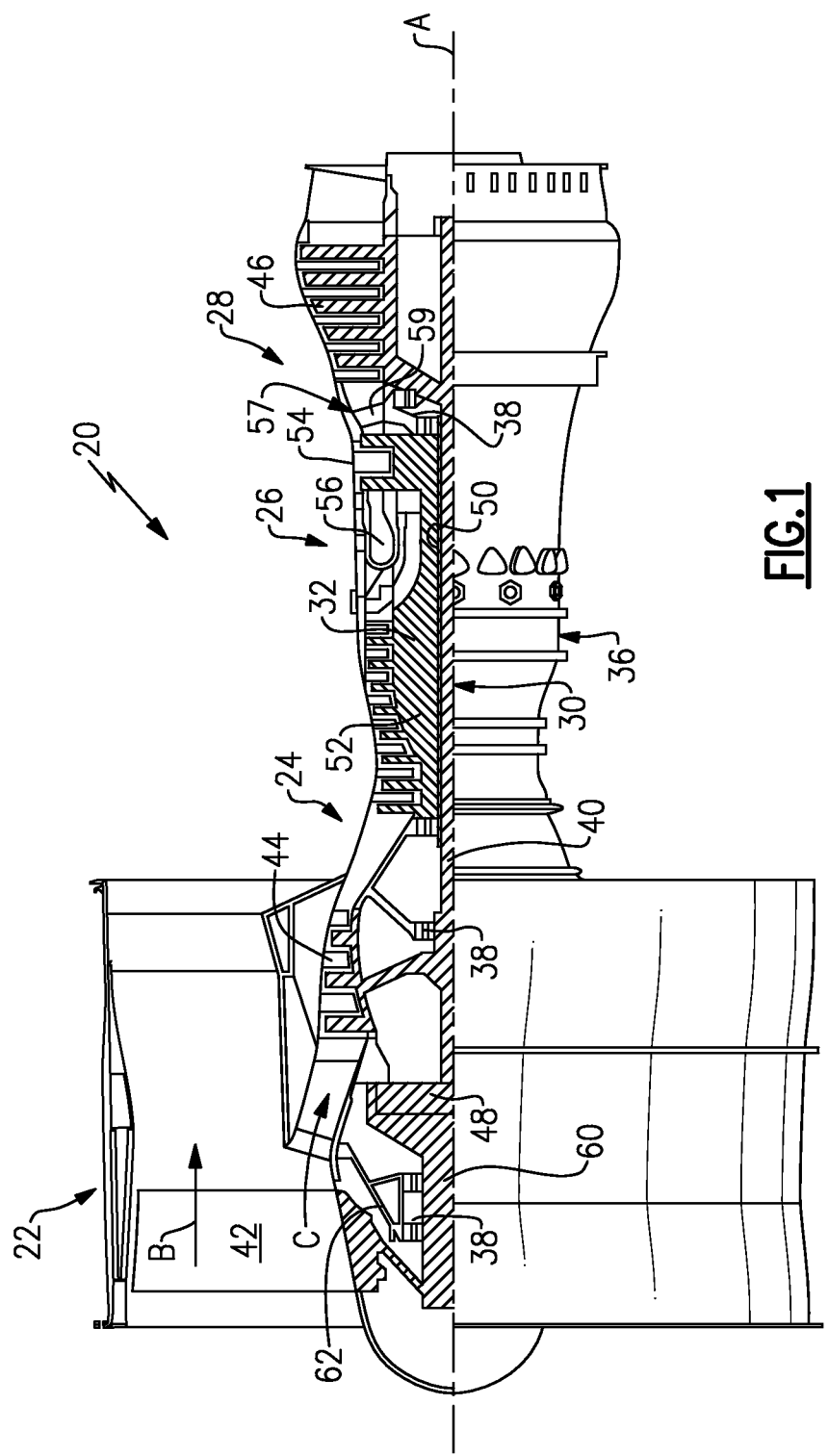
FIG. 1 shows a partial section view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7)^{\wedge}0.5]$. The "Low corrected fan tip speed" as disclosed herein according to one non-limiting embodiment is less than about 1150 ft/second.

A fan shaft 60 interconnects the geared architecture 48 to the fan 42. The fan shaft 60 is supported by a pair of bearings 38, which are tapered roller bearings in one example. The bearings normally limit the axial travel of the fan shaft 60 and fan 42. During operation, the engine 20 may experience extreme events such as a fan blade loss or a failure of a fan shaft bearing support 62 supporting the bearings 38, which is part of the engine static structure 36. In such events, the fan 42 may undesirably tend to move axially forward relative to the other portions of the engine 20, such that the fan 42 and associated components could become disengaged from the engine 20.

Figure 2A:
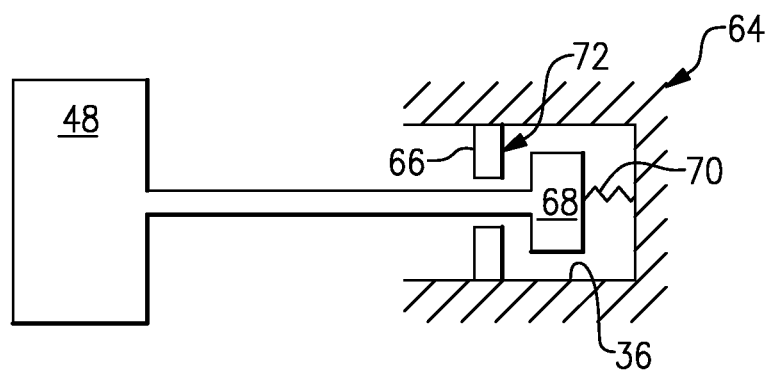
FIG. 2A depicts a highly schematic view of an example geared architecture support assembly of the FIG. 1 gas turbine engine during normal operation.
Figure 2B:
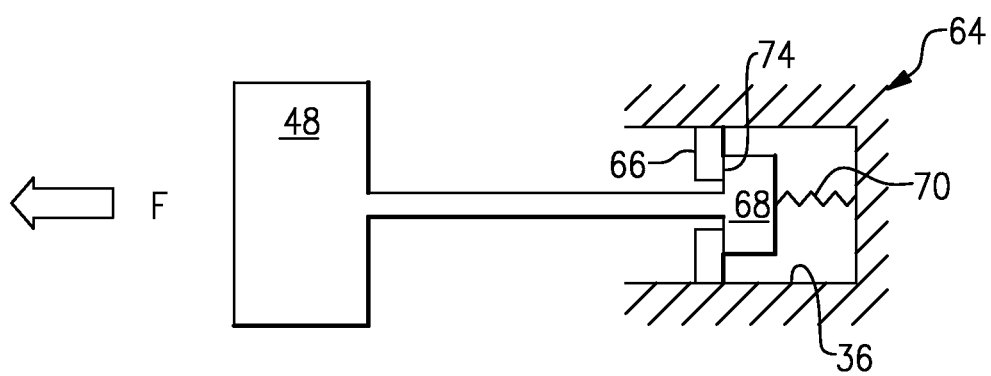
FIG. 2B depicts a highly schematic view of the FIG. 2A geared architecture support during an extreme event.

Referring to FIGS. 2A and 2B with continuing reference to FIG. 1, the example engine 20 includes other features that limit movement of the fan 42 during an extreme event, particularly if the bearings 38 or bearing support 62 are ineffective. For example, the example engine 20 includes a geared architecture support assembly 64 that limits forward movement of the fan 42 and the geared architecture 48 during an extreme event.

The example support assembly 64 includes at least a first member 66 and a second member 68. The first member 66 and the second member 68 are respectively operatively connected to the geared architecture 48 and the engine static structure 36, which functions as a mechanical ground. A compliant flex support 70 mounts the geared architecture 48 to the engine static structure 36. In the example, the first member 66 and the second member 68 are both arranged axially aft the geared architecture 48 relative to a direction of flow through the engine 20.

During normal engine operation, the first and second members 66, 68 are spaced apart from one another providing a gap 72, as shown in FIG. 2A. During an extreme event, such as a blade loss, the geared architecture 48 may experience an extreme load in the direction F due to the fan 42 rotating and attempting to move axially forward relative to other portions of the engine 20, as shown in FIG. 2B. In such an event, extreme movements of the geared architecture 48 are limited by the cooperation of the first and second members 66, 68 such that the loading in the direction F causes the first and second members 66, 68 to engage one another at area 74. This contact blocks movement of the geared architecture 48 axially forward. Since the geared architecture 48 is connected to the fan 42, limiting movement of the geared architecture 48 may prevent the fan 42 from moving axially forward the remaining attached portions of the engine 20.

Figure 3:
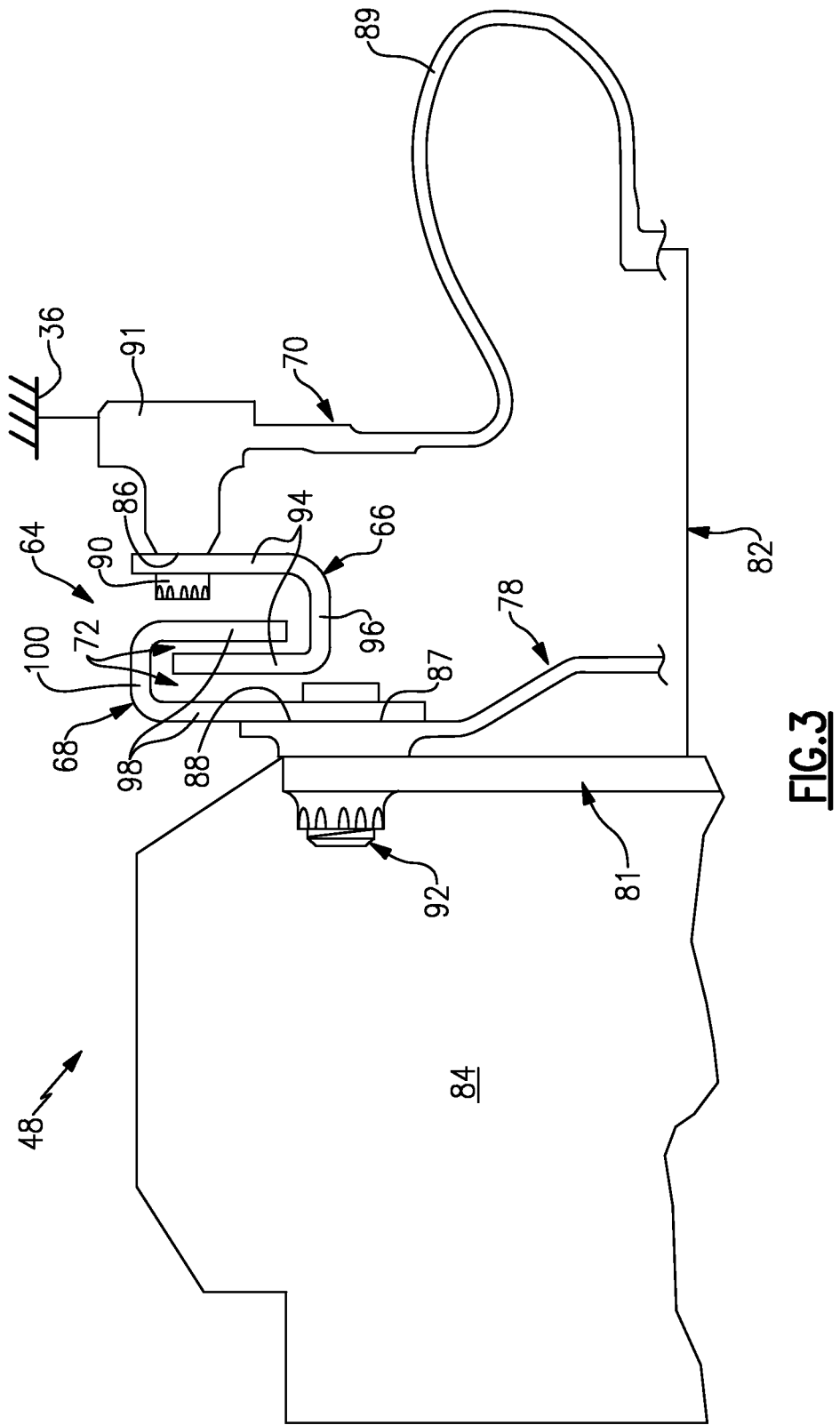
FIG. 3 is a cross-sectional view of a geared architecture and an example support assembly during normal operation.

One example support assembly 64 is illustrated schematically in FIG. 3. The flex support 70 is secured to a carrier 81 by a torque frame 82. A lubrication manifold 78 is arranged axially between the carrier 81 and the flex support 70. A geartrain 84 of the geared architecture 48 is supported by the torque frame 82. In one example, the geartrain 84 is a planetary gear arrangement in which planetary gears are supported by the carrier 81 and fixed against rotation by torque frame 82. A central sun gear receives rotational drive from the inner shaft 40 (FIG. 1) and a ring gear rotationally drives the fan 42 through the fan shaft 60 (FIG. 1).

The flex support 70 includes a bellow 89, which is provided by a wall that doubles back on itself to provide an undulation. The bellow 89 accommodates a relative movement of the geared architecture 48 relative to the engine static structure 36. An annular mounting flange 91 at an end opposite the bellow 89 is rotationally fixed relative to the engine static structure 36 by fasteners, splines and/or other means.

In the example illustrated, the support assembly 64 is provided by sets of first and second members 66, 68, which are removably secured respectively to the flex support 70 and the lubrication manifold 78. The first and second members 66, 68 are provided by U-shaped brackets oriented in opposite radial positions from one another to facilitate assembly. In the example, each set of members include five circumferentially spaced brackets.

The support assembly 64 may be retrofitted to existing gas turbine engines with geared architectures. In one example, first and second machined surfaces 86, 88 are respectively provided on the flex support 70 and a back side 87 of the lubrication manifold 78. If these machined surfaces are not provided on existing parts, the manufacturer can mill these surfaces, for example, as part of the retrofitting process. First fasteners 90 secure the first member 66 to the end 91. Second fasteners 92 secure the second member 68 to the lubrication manifold 78 and carrier 81. Existing geared architectures may be retrofitted by replacing the pre-existing fasteners that secure the lubrication manifold 78 to the carrier 81 with longer fasteners while reusing existing holes in the carrier 81 and the lubrication manifold 78. The first and second fasteners 90, 92 are threaded fasteners in one example.

Each first member 66 is provided by spaced apart legs 94 joined by a bend 96. Similarly, each second member 68 is provided by spaced apart legs 98 joined by a bend 100. The legs 94, 98 are axially spaced from one another to provide the gap 72 during normal operation.

Figure 4:
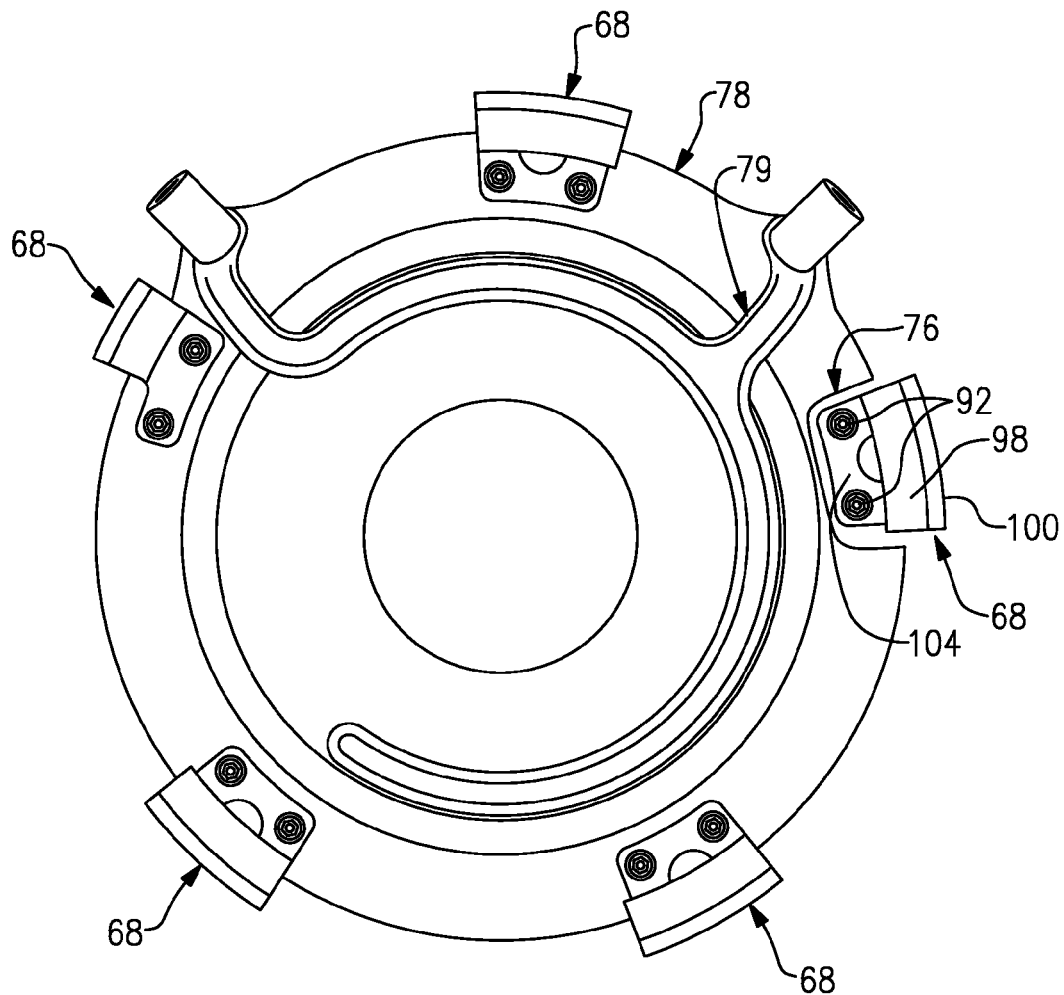
FIG. 4 is a rear view of an example oil manifold of the support assembly.
Figure 5:
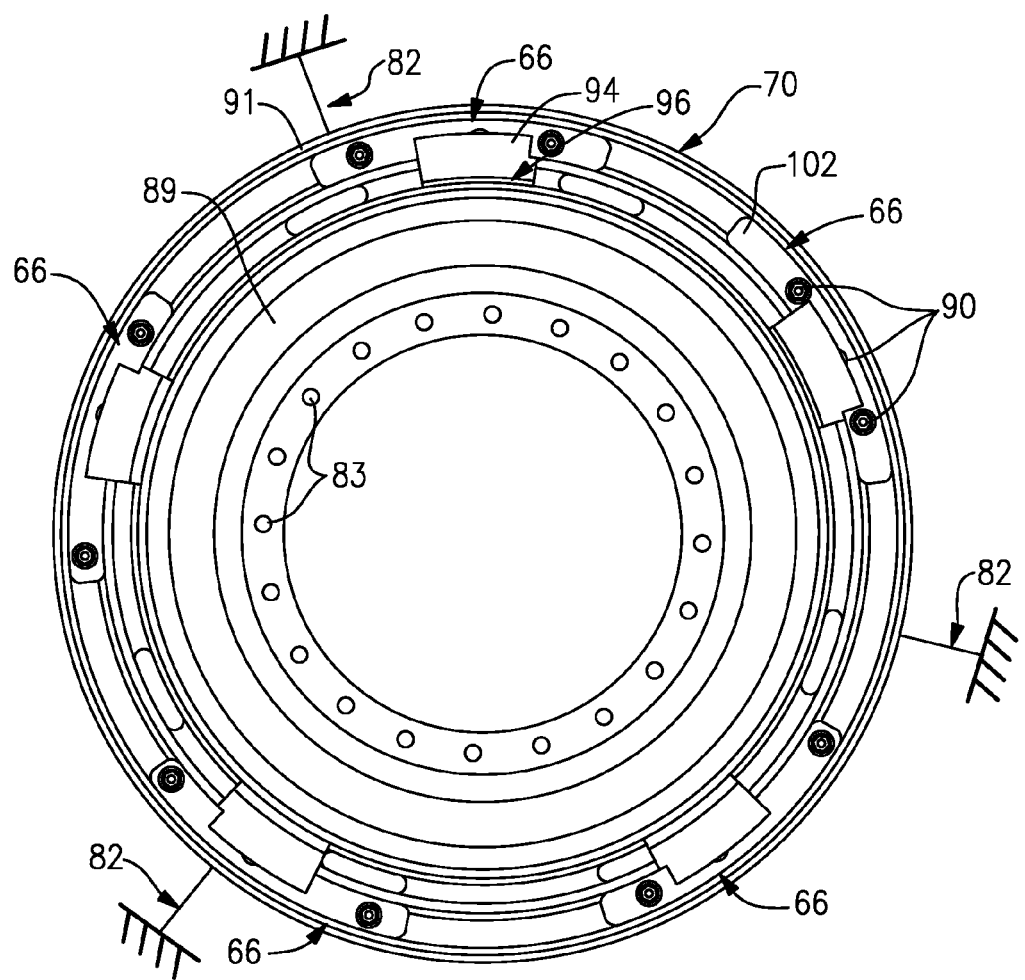
FIG. 5 is a front view of an example flex support of the support assembly.

Referring to FIG. 4, the lubrication manifold 78 may include integrally formed lubrication passages 79 that are cast into the lubrication manifold 78 to provide a unitary structure. The second members 68 include a second flange 104 supporting a leg 98 and secured to an outer periphery of the lubrication manifold. Alternately, the second member 68 could be secured directly to the carrier 81 through windows or scallops 76 in the lubrication manifold 78. Referring to FIG. 5, the first member 66 includes a first flange 102 supporting a leg 94 and secured to the annular mounting flange 91 of the flex support 70.

Figure 6A:
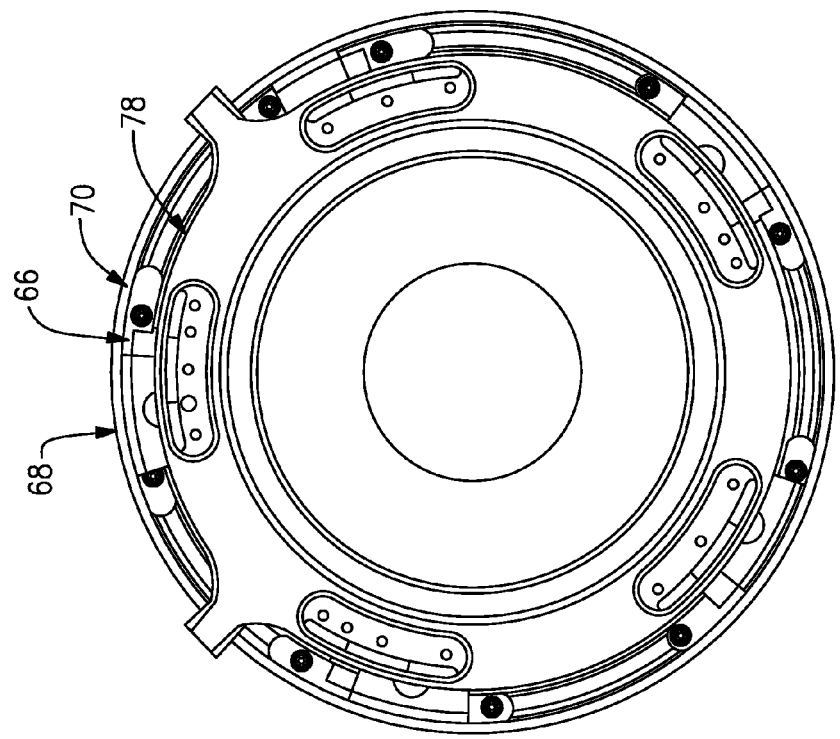
FIG. 6A is a front view of the oil manifold and flex support in a first angular position during assembly.
Figure 7:
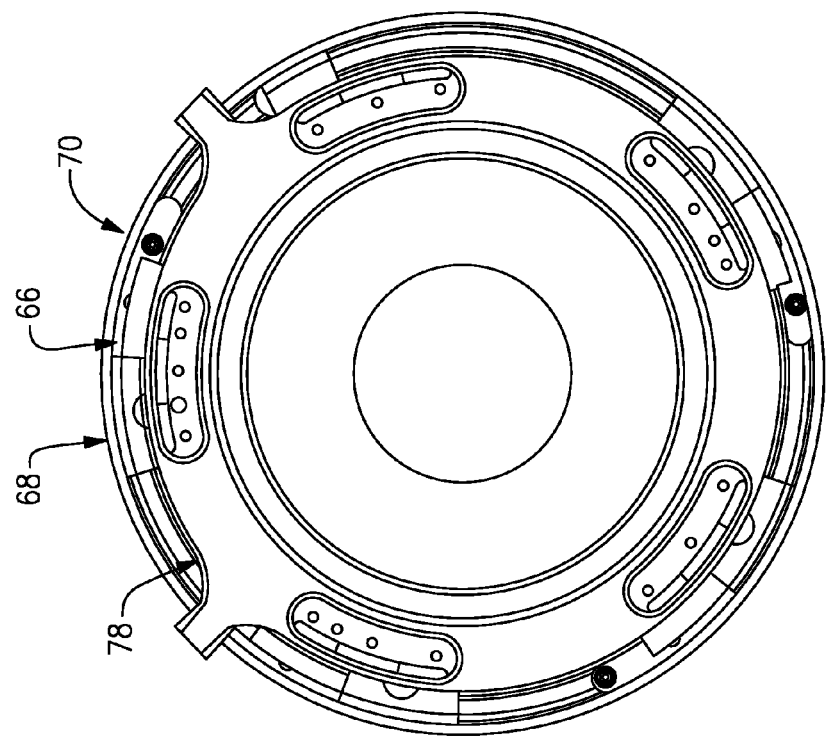
FIG. 7 is a front view of the oil manifold and flex support in a second angular position after assembly.
Figure 6B:
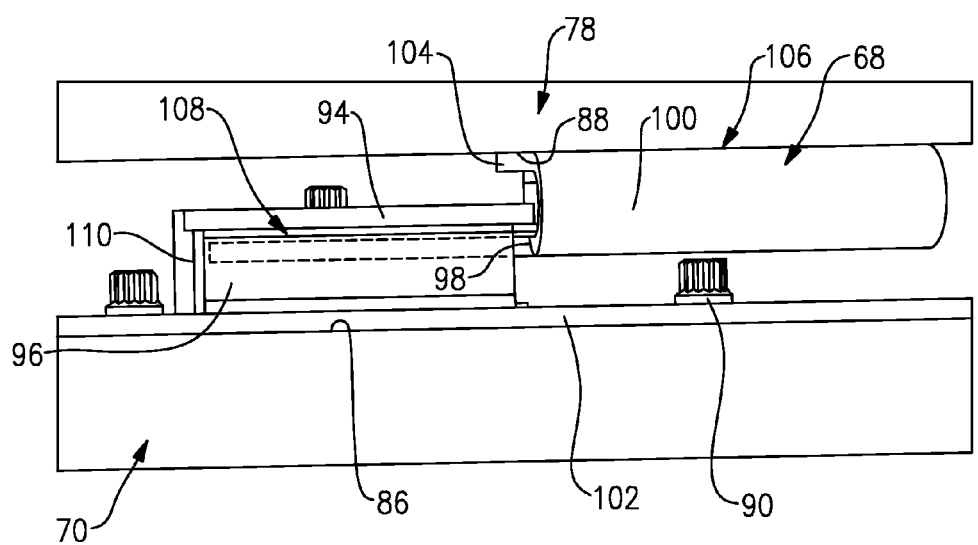
FIG. 6B is a top elevational view of the support assembly in the first angular position.

Referring to FIGS. 6A-7, with the first and second members 66, 68 respectively are secured to the flex support 70 and the lubrication manifold 78. The lubrication manifold 78 is arranged in a first angular position 106, illustrated in FIGS. 6A and 6B, such that the first and second members 66, 68 are circumferentially adjacent to one another but misaligned. The lubrication manifold 78 is rotated relative to the flex support 70 to circumferentially align the first and second members 66, 68 relative to one another in a second angular position 108. In this example, the first member 66 includes a stop or brace 110 to strengthen the axial retention of the member. The annular rotation is limited by existing features, which are machined into the torque frame 82 and the flex support 70.

Features of the disclosed examples include a support structure that permits some movement of a geared architecture relative to other portions of an engine during normal operation of the engine, but limits movements during extreme events, particularly axially forward movements of the geared architecture.

Although an example embodiment has been disclosed, a worker of ordinary skill in this art would recognize that certain modifications would come within the scope of the claims. For that reason, the following claims should be studied to determine their true scope and content.

What is claimed is:

1. A support assembly for a geared architecture comprising:
    an engine static structure;
    a flex support secured to the engine static structure and including a bellow;
    a support structure operatively secured to the flex support;
    a geared architecture mounted to the support structure; and
    first members removably secured to one of the engine static structure and the flex support, and second members removably secured to the support structure, the first and second members circumferentially aligned with one another and spaced apart from one another during a normal operating condition, and the first and second members configured to be engageable with one another during an extreme event limiting axial movement of the geared architecture relative to the engine static structure in first and second axial directions that are opposite one another.

2. The support assembly according to claim 1, wherein the flex support includes an end opposite the bellow, the first members removably secured to the end.

3. The support assembly according to claim 2, wherein the end is an annular mounting flange.

4. The support assembly according to claim 1, wherein the support structure includes a torque frame and a carrier, the second members is removably secured to at least one of the torque frame and the carrier.

5. The support assembly according to claim 4, wherein the support structure includes an annular lubrication manifold, the second members removably secured to the carrier and the lubrication manifold.

6. The support assembly according to claim 5, wherein the lubrication manifold is arranged axially between and engaging both the carrier and the second member.

7. The support assembly according to claim 1, comprising threaded fasteners removably securing the first member and the second member to the flex support and the support structure, respectively.

8. A method of retrofitting a support assembly to a gas turbine engine having a geared architecture, comprising the steps of:
providing attachment features in first and second structures;
securing first and second members respectively to the first and second structures;
arranging the first and second members in axially interleaved spaced relation to one another in an installed condition; and
installing the first structure onto an engine static structure and installing a geared architecture onto the second structure;
wherein the arranging step includes positioning the first and second members in a first angular position relative to one another in a non-interleaved relationship, and rotating the first and second members from the first angular position to a second angular position to interleave the first and second members, the first and second angular positions in a common same plane.

9. The method according to claim 8, wherein the attachment features providing step includes providing machined surfaces on the first and second structures that receive the first and second members in the securing step.

10. The method according to claim 9, wherein the first structure is a flex support having a bellow and an annular mounting flange opposite the bellow, the securing step includes mounting the first members to the annular mounting flange.

11. The method according to claim 10, wherein the securing step includes mounting a lubrication manifold onto the second structure, and securing the second members over the lubrication manifold and in engagement with the lubrication manifold and the second structure.

12. The method according to claim 11, wherein the installing step includes securing a torque frame to the flex support and a carrier, the carrier supporting the geared architecture.

13. The method according to claim 8, wherein the securing steps include tightening threaded fasteners.

14. The method according to claim 13, wherein the securing step relating to the second members includes selecting fasteners having a length longer than a length of pre-existing fasteners at the attachment features, which are removed during retrofitting.

15. A gas turbine engine comprising:
an engine static structure;
a flex support secured to the engine static structure and including a bellow;
a support structure operatively secured to the flex support;
a geared architecture mounted to the support structure;
a fan section operatively coupled to the geared architecture; and
first members removably secured to one of the engine static structure and the flex support, and second members removably secured to the support structure, the first and second members circumferentially aligned with one another and spaced apart from one another during a normal operating condition, and the first and second members configured to be engageable with one another during an extreme fan section event limiting axial movement of the geared architecture relative to the engine static structure in first and second axial directions that are opposite one another.

16. The gas turbine engine according to claim 15, comprising low and high spools, low pressure compressor and turbine sections mounted on the low spool, and high pressure compressor and turbine sections mounted on the high spools, the low spool operatively coupled to the geared architecture.

17. The gas turbine engine according to claim 15, wherein the geared architecture is a planetary gear train.

18. The gas turbine engine according to claim 15, wherein the fan section includes a fan shaft supporting a fan, the fan shaft supported relative to the engine static structure by bearings.

19. The gas turbine engine according to claim 15, comprising threaded fasteners removably securing the first member and the second member to the flex support and the support structure, respectively.

20. An engine support assembly, comprising:
an engine static structure, and a support structure operatively mounted to the static structure and supporting a movable engine component;
first and second members that are circumferentially aligned and respectively connected to the engine static structure and the support structure;
wherein an aft facing surface of the first member axially opposes and is biased axially away from a forward facing surface of the second member, thereby limiting axial movement of the movable engine component relative to the engine static structure.

21. The engine support assembly according to claim 20, wherein the movable engine component is a geared architecture.

22. The engine support assembly according to claim 20, comprising a bellows connected to the engine static structure for biasing the first member away from the second member.

\* \* \* \* \*